United States Patent
Jerding et al.

(10) Patent No.: US 6,629,227 B1
(45) Date of Patent: Sep. 30, 2003

(54) SYSTEM AND METHOD FOR A COMMUNICATION TERMINAL TO MANAGE MEMORY AND MAINTAIN A CURRENT APPLICATION VERSION FOR MULTIPLE APPLICATIONS

(75) Inventors: Dean F. Jerding, Roswell, GA (US); Arturo A. Rodriguez, Norcross, GA (US); John M. Schlarb, Alpharetta, GA (US); Frank Domina, Atlanta, GA (US)

(73) Assignee: Scientific-Atlanta, Inc., Norcross, GA (US)

( * ) Notice: Subject to any disclaimer, the term of this patent is extended or adjusted under 35 U.S.C. 154(b) by 0 days.

(21) Appl. No.: 09/564,974

(22) Filed: May 4, 2000

(51) Int. Cl.[7] .......................... G06F 12/02; G06F 12/08
(52) U.S. Cl. ........................ 711/170; 717/170; 709/215; 711/148
(58) Field of Search ................... 711/170, 171, 711/172, 173; 717/170, 171, 172, 173; 725/50, 132, 140, 152, 115, 89; 709/215

(56) References Cited

U.S. PATENT DOCUMENTS

| | | | |
|---|---|---|---|
| 5,563,648 A | * 10/1996 | Menand et al. | 725/105 |
| 5,721,815 A | * 2/1998 | Ottesen et al. | 345/721 |
| 5,727,178 A | * 3/1998 | Pletcher et al. | 711/163 |
| 5,809,554 A | * 9/1998 | Benayon et al. | 711/171 |
| 6,088,764 A | * 7/2000 | Shyam et al. | 711/112 |
| 6,131,150 A | * 10/2000 | DeTreville | 711/170 |
| 6,237,072 B1 | * 5/2001 | Houlsdworth | 348/121 |
| 6,317,816 B1 | * 11/2001 | Loen | 711/171 |
| 6,453,404 B1 | * 9/2002 | Bereznyi et al. | 711/171 |

FOREIGN PATENT DOCUMENTS

| | | |
|---|---|---|
| EP | 0489204 | 10/1992 |
| EP | 0811911 | 10/1997 |
| WO | WO95/16958 | 6/1995 |
| WO | WO 99/15964 | 4/1999 |
| WO | WO 99/53401 | 10/1999 |

OTHER PUBLICATIONS

Silberschatz and Galvin, "Operating system Concepts, 5th edition", 1999, pp. 250–254.*

"Fail–Safe Message for Insufficient Disk Space," IBM Technical Disclosure Bulletin, IBM Corp., New York, vol. 37, No. 4A, Apr. 1, 1994, XP000446759, p. 513.

* cited by examiner

*Primary Examiner*—Matthew Kim
*Assistant Examiner*—Pierre Michel Bataille

(57) ABSTRACT

A system and method for a communication terminal to manage memory and maintain a current application version for multiple applications are provided. The system and method provide for managing memory in a communication terminal coupled to a server device enabling the communication terminal to provide memory capacity for storing in a memory and executing on the communication terminal a plurality of applications downloaded from the server device. Prior to downloading an application, the communication terminal determines an amount of memory capacity required by an application client to be downloaded from the server device. The communication terminal then attempts to allocate the memory capacity. If memory cannot be allocated from the system heap, the communication terminal purges data contained in the memory according to a dynamic list of priorities to create memory capacity in the memory for the application client. Once sufficient memory capacity has been created, it is allocated to the application client, and the application client is downloaded to the communication terminal.

28 Claims, 8 Drawing Sheets

SYSTEM AND METHOD FOR A COMMUNICATION TERMINAL TO MANAGE MEMORY AND MAINTAIN A CURRENT APPLICATION VERSION FOR MULTIPLE APPLICATIONS

FIELD OF THE INVENTION

This invention relates in general to the field of television systems, and more particularly, to the field of memory management and application versioning in a communication terminal.

BACKGROUND

Historically, television services have been comprised of analog broadcast audio and video signals. Cable television systems now receive broadcasts and retransmit them with other programming to subscribers over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communications terminal ("HCT"), otherwise known as the settop box, has become an important computing device for accessing video services and navigating a subscriber through a maze of services available. In addition to supporting traditional analog broadcast video functionality, digital HCTs (or "DHCTs") now also support an increasing number of services that are not analog, but rather digital; are not basic broadcast, but rather two-way communication such as video-on-demand; and are not basic video, such as e-mail or web browsers. These are all in addition to the host of other television services that are increasingly being demanded by consumers, examples of which include audio and audio/visual programming, advance navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those that have traditionally been provided.

Each HCT and DHCT (collectively hereinafter "DHCT") is typically connected to a cable or satellite television network. The DHCTs generally include hardware and software necessary to provide the functionality of the digital television system at the subscriber's site. Preferably, some of the software executed by a DHCT is downloaded and/or updated via the cable television network. Each DHCT typically includes a processor, a communication component and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As more and more services and applications are made available, it becomes increasingly important to properly manage limited client resources. Because the memory contained in the DHCT is typically finite, only a limited number of services and applications may be downloaded to and stored on the DHCT at any given time. Once the memory of the DHCT becomes full with applications and other data, a DHCT may be unable to download additional files or applications for the user due to the memory incapacity. For the user, this scenario can result in a denial of a particular service, or worse, a complete failure of the DHCT due to a memory error. As the number of applications available to a user continues to grow, a conventional DHCT may be unable to implement many of these applications once the memory becomes full for the first time. The cost of additional DHCT memory may be prohibitive for the system operator or subscriber; in any case memory is always finite and out of memory conditions will occur.

Additionally, as services and applications are updated by system operators of the cable television systems, the versions already contained on the DHCTs can become outdated and unsupported. While the cable systems may support old versions of applications for a short period of time, eventually these applications may fail when activated by the DHCT because of their incompatibility with the cable television system headend. As a result, once the memory capacity of a conventional DHCT has become full, then not only is that DHCT typically limited to those applications contained in memory, but also those applications may have limited lifespan as updated versions are released over the network by the cable television system.

SUMMARY OF THE INVENTION

Briefly described, the preferred embodiment of the present invention provides a system and method for managing memory in a DHCT coupled via a communication port to a server device by enabling the DHCT to prioritize application access to memory and to further handle out-of-memory situations while executing on the DHCT a plurality of applications downloaded from the server device. In one implementation, prior to downloading an application, the DHCT determines an amount of memory capacity required to execute an application client after the application client is downloaded from the server device. The DHCT then attempts to allocate the memory capacity from a private heap of the memory to the application client. If unsuccessful, the DHCT attempts to allocate the memory capacity from a system heap of the memory to the application client. If memory cannot be allocated from the system heap, the DHCT purges data contained in the memory according to a dynamic list of priorities to create memory capacity in the memory for the application client. Once sufficient memory capacity has been created, it is allocated to the application client after the application client is downloaded to the DHCT.

Further, while the application is executing and actively providing a service, its request for memory may exceed that currently available on the DHCT. The DHCT then follows the same protocol mentioned above to make memory available for the application. This process can include asking other applications to free unneeded or lower priority memory and if still not enough room to free higher priority memory. Finally, other applications that are not currently providing services to the user may be unloaded to meet the memory request of the application with which the user is currently interacting.

In addition, according to the preferred embodiment, a version table is also periodically downloaded from the server device (headend) and referenced each time an application is activated to ensure that the correct version is being activated, otherwise prompting the DHCT to unload the old version and download the newest version of the application.

One advantage of the preferred embodiment of the present invention is that it solves the problem of limited memory in the DHCT by enabling the DHCT to create memory capacity to load and execute new applications desired by a subscriber without failing or crashing.

Another advantage of the preferred embodiment of the present invention is that it enables applications of higher priority to be the last applications to be removed from the DHCT when making memory available to an application to be downloaded.

Another advantage of the present invention is that memory capacity is properly maintained through systematic downloading of updated versions of applications as made available by the headend server.

Other advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
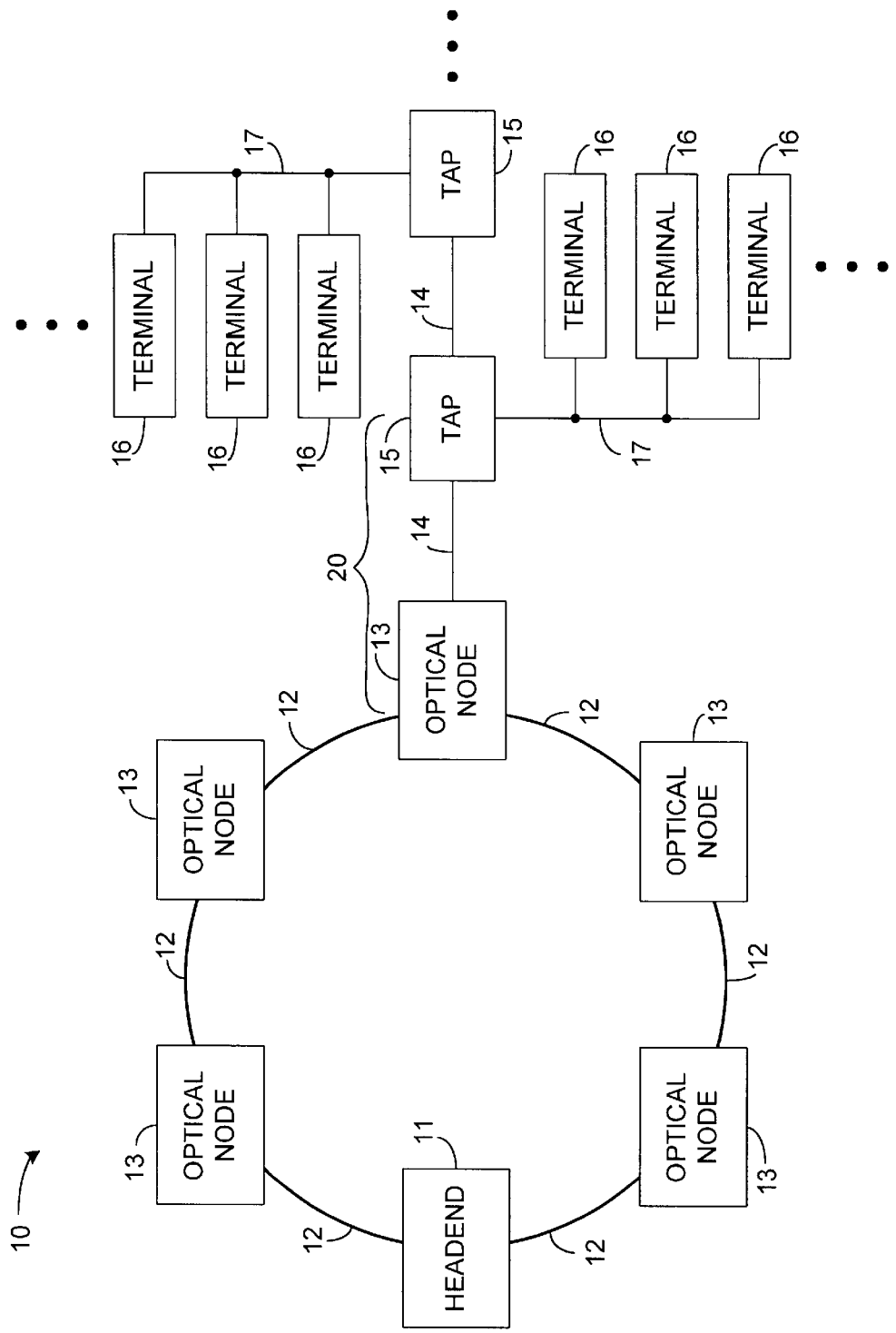
FIG. 1 is a block diagram of a cable television system in accordance with one embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
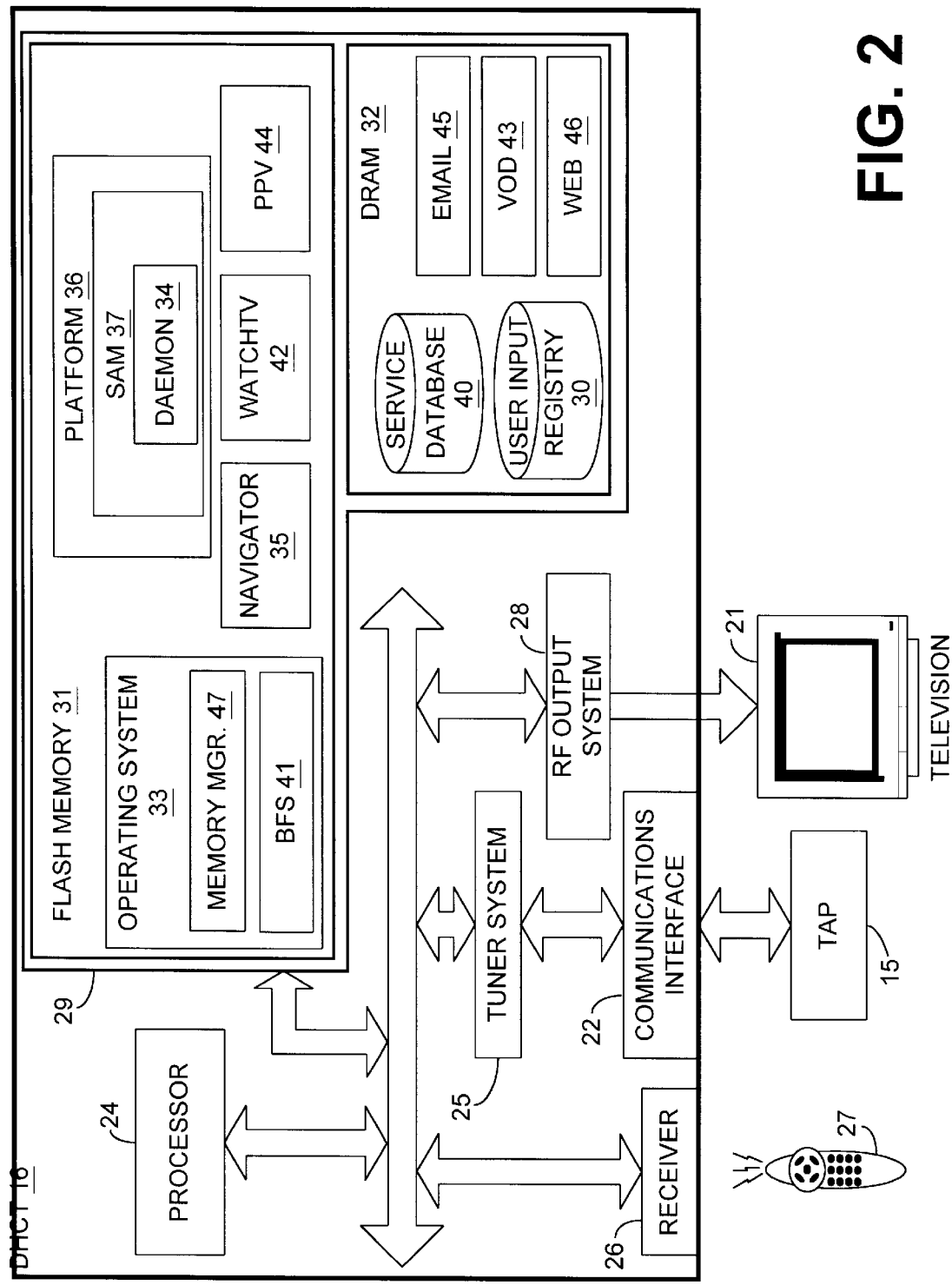
FIG. 2 is a block diagram of selected DHCT components and applications in various memories with related equipment in accordance with the preferred embodiment of the present invention depicted in FIG. 1.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included in a computer or a television, and that media transported in television signals for presentation or playback to a subscriber. The DHCT 16 preferably comprises a communications interface 22 for receiving the RF signals, which can include media such as video, audio, graphical and data information, from the tap 15 and for providing any reverse information to the tap 15 for transmission back to the headend 11 (FIG. 1). The DHCT 16 further includes a processor 24 for controlling operations of the DHCT 16, including a video output port such as an RF output system 28 for driving the display 21, a tuner system 25 for tuning into a particular television channel to be displayed and for sending and receiving data corresponding to various types of media from the headend 11. The tuner system includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as subscriber inputs or commands from other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), serial, and/or parallel ports. The subscriber inputs may, for example, be provided by a computer or transmitter with buttons or keys located either on the exterior of the terminal or by a hand-held remote control device 27 or keyboard that includes subscriber-actuated buttons.

In one implementation, a memory portion 29 of the DHCT 16 includes flash memory 31 and dynamic random access memory (DRAM) 32 for storing the executable programs and related data components of various applications and modules for execution by the DHCT 16. Both the flash memory 31 and the DRAM memory 32 are coupled to the processor 24 for storing configuration data operational parameters, such as commands that are recognized by the processor 24.

Basic functionality of the DHCT 16 is provided by an operating system 33 that is contained in flash memory 31. One or more programmed software applications, herein referred to as applications, are executed by utilizing the computing resources in the DHCT 16. The application executable program stored in flash memory 31 or DRAM memory 32 is executed by processor 24 (e.g., a central processing unit or digital signal processor) under the auspices of the operating system 33. Data required as input by the application program is stored in DRAM memory 32 and read by processor 24 from DRAM memory 32 as need be during the course of application program execution. Input data may be data stored in DRAM memory 32 by a secondary application or other source, either internal or external to the DHCT 16, or possibly anticipated by the application and thus created with the application program at the time it was generated as a software application program, in which case it is stored in flash memory 30. Data may be received via any of the communication ports of the DHCT 16, from the headend 11 via the network interface of the DHCT 16 (i.e., the QAM or out-of-band tuners) or as subscriber input via receiver 26. Data generated by application program is stored in DRAM memory 32 by processor 24 during the course of application program execution.

Availability, location and amount of data generated by a first application for consumption by a secondary application is communicated by messages. Messages are communicated through the services of the operating system, such as interrupt or polling mechanisms or data sharing mechanisms such as semaphores.

The operating system 33 operates a broadcast file system (BFS) client module 41. The BFS client 41 is in constant communication with a similar module on the server side (BFS server 55 in FIG. 3) in the headend 11. This BFS system 41, 55 provides a mechanism for delivering various types of media or data from a group of servers to a client such as the DHCT 16 attached to the network 10. This data can contain practically any type of information. Applications on both the server and the client can access the data via the BFS in a similar manner to a file system found on disk operating systems.

The operating system 33 also maintains a memory manager 47 that controls the memory in the DHCT 16. The memory manager 47 functions to allocate memory resources to store application executables and other data (i.e., such as program data files (not shown) or configuration files (not shown)) as required by the various applications of the DHCT 16. The memory manager 47 additionally issues commands to applications to minimize their resources or terminate completely if necessary to make memory capacity available for an application to be downloaded from the headend 11.

The executable software program of applications or modules can be stored in flash memory 31 or DRAM 32. One or more executable software programs of applications and/or modules as well as all or parts of their respective data components are stored in flash memory 31. For instance, contained in flash memory 31 is a navigator application 35, which provides a navigation framework for the subscriber to access services available on the cable system 10. Examples of the services include, in one implementation, watching television and pay-per-view events, listening to digital music, and an interactive program guide, each of which is controlled through separate applications in flash memory 31. The navigator 35 also allows users to access various settings of the DHCT 16, including volume, parental control, VCR commands, etc. The navigator 35 additionally is responsible for providing the subscriber with the capability to select various services.

WatchTV 42 and Pay-Per-View (PPV) 44 are resident applications in flash memory 31. WatchTV 42 enables a user to simply "watch television" while PPV enables viewing of premium television services. These applications, because they are in flash memory, are always available to the subscriber and do not need to be re-downloaded each time the DHCT 16 initializes.

The flash memory 31 also contains a platform library 36. The platform library 36 is a collection of functionality useful to applications, such as a timer manager, compression manager, a HTML parser, database manager, widget toolkit, string managers, and other utilities (not shown). These utilities are accessed by applications as necessary so that each application does not have to contain these utilities. Shown in FIG. 2 for the platform library 36 are a service application manager (SAM) 37.

The service application manager (SAM) server 56 (FIG. 3) and client 37 provide a model in which the subscriber can access services, which consist of an application to run and a parameter, such as data content, specific to that service. The SAM server 56 and client 37 also handle the life cycle of the applications on the system, including the definition, initialization, activation, suspension, and un-installation of services they provide and the downloading of the application into the DHCT 16 as necessary. SAM client 37 (hereinafter referred to as SAM 37) includes a SAM daemon 34 to accomplish downloading of new applications when requested by a subscriber or when new versions of the applications are available from the server.

Many services can be defined using the same application component, with different parameters. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID.

Various application clients can be downloaded into DRAM 32 via the BFS at the request of the SAM 37. An application client is the portion of an application that executes on the DHCT 16 and provides the application's services to the subscriber typically through a graphical user interface. The applications that are stored in the DRAM 32 may be applications that are loaded when the DHCT 16 initializes or are applications that are downloaded to the DHCT 16 upon a subscriber-initiated command using an input device such as remote control 27. In this non-limiting example, as shown in FIG. 2, DRAM 32 contains the following application clients (hereinafter referred to as "application"): a video-on-demand application (VOD) 43, an e-mail application 45, and a web browsing application 46. It should be clear to one with ordinary skill in the art that these applications are not limiting and merely serve as examples for this present embodiment of the invention.

The applications shown in FIG. 2 and all others provided by the cable system operator are top level software entities on the network for providing services to the subscriber. In one implementation, all applications executing on the DHCT 16 work with the navigator application 35 by abiding by several guidelines. First, an application must utilize and implement the SAM 37 for provisioning, activation, and suspension of services. Second, an application must share DHCT 16 resources with other applications and abide by the resource management policies of the SAM 37, the operating system 33, and the DHCT 16. Third, an application must handle all situations where resources are unavailable. Fourth, when an application loses service authorization while providing a service, an application should suspend the service that the application is providing. The navigator 35 will reactivate an individual service application when it later becomes authorized. Finally, an application must be configured so it does not have access to certain user subscriber input keys (i.e., power, channel +/−, volume +/−, etc.).

Figure 3:
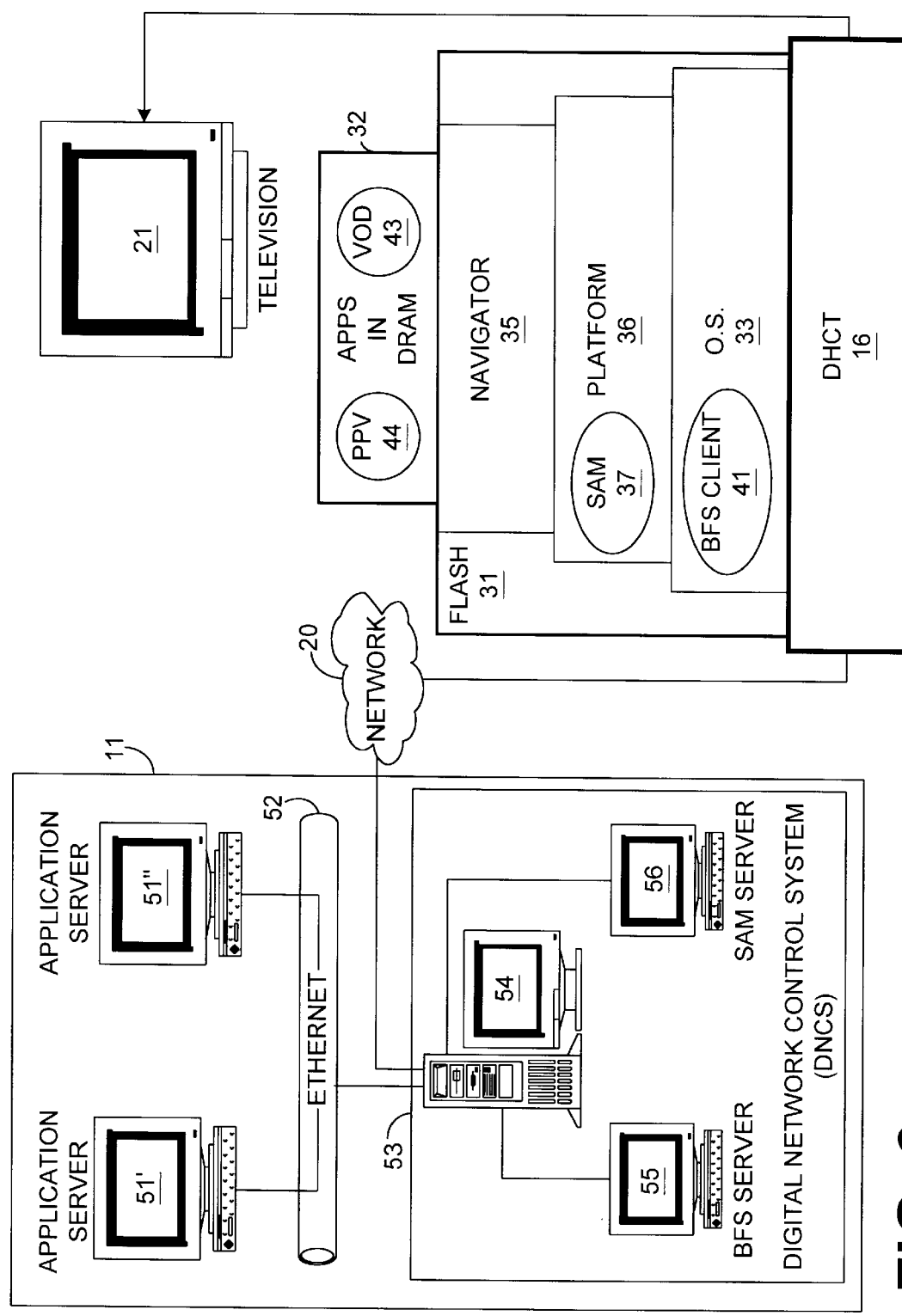
FIG. 3 is a diagram of the cable television system of FIG. 1 including selected components located in the headend of the cable television system and a layered view of selected elements in the DHCT.

FIG. 3 is a diagram of the cable television system of FIG. 1 including selected components located in the headend of the cable television system and a layered view of selected elements in the DHCT. In the implementation shown, the headend 11, includes multiple application servers 51, 51', 51" that are responsible for provisioning the services provided by the application and for providing the content or data needed by the DHCT 16, which is discussed in more detail below. A series of application servers 51 are connected to a digital network control system 53 via an Ethernet connection 52 such as a 10 BaseT or a 100 BaseT. An application server manager (not shown) may be included to serve as a registry for all application servers 51 residing on the system headend 11. Through the application server manager graphical user interface (GUI), the GUI for all application servers 51 can be accessed.

The digital network control system (DNCS) 53 provides complete management, monitoring, and control of the network's elements and broadcast services provided to subscribers. The DNCS 53 includes the definitions of sources, digital storage media command and control (DSM-CC) user-to-network configuration of DHCTs in the network 20 and conditional access management. The application server 51 communicates via the ethernet 52, through an operational system 54 to the SAM server 56 contained on the DNCS 53. The application server 51 registers itself with the SAM server 56, instigating the application's introduction on the SAM server 56 and SAM 37, and the SAM server 56 instructs the BFS server 55 to add the particular application client executable code and possibly one or more data components related to the service to the carousel (not shown) for distribution to the various DHCTs of the network 10. The SAM server 56 provides various features for each application that directs its execution in the network 20. In preparation to introduce the application, the SAM server 56 also provides a mapping from the display channel number presented to the subscriber to the service, and vice versa, including the capability to have one service on a channel for a specified time and another service on that channel for a different specified time. The SAM server 56 additionally provides an interface on the SAM server 56 to specify service-related data, and the SAM client 36 on the DHCT 16 provides an interface to access this information efficiently. The SAM server 56 contains information and configuration data whereby applications and services on the DHCT 16 can be activated and suspended remotely by the SAM server 56 by a signaling message.

Figure 4:
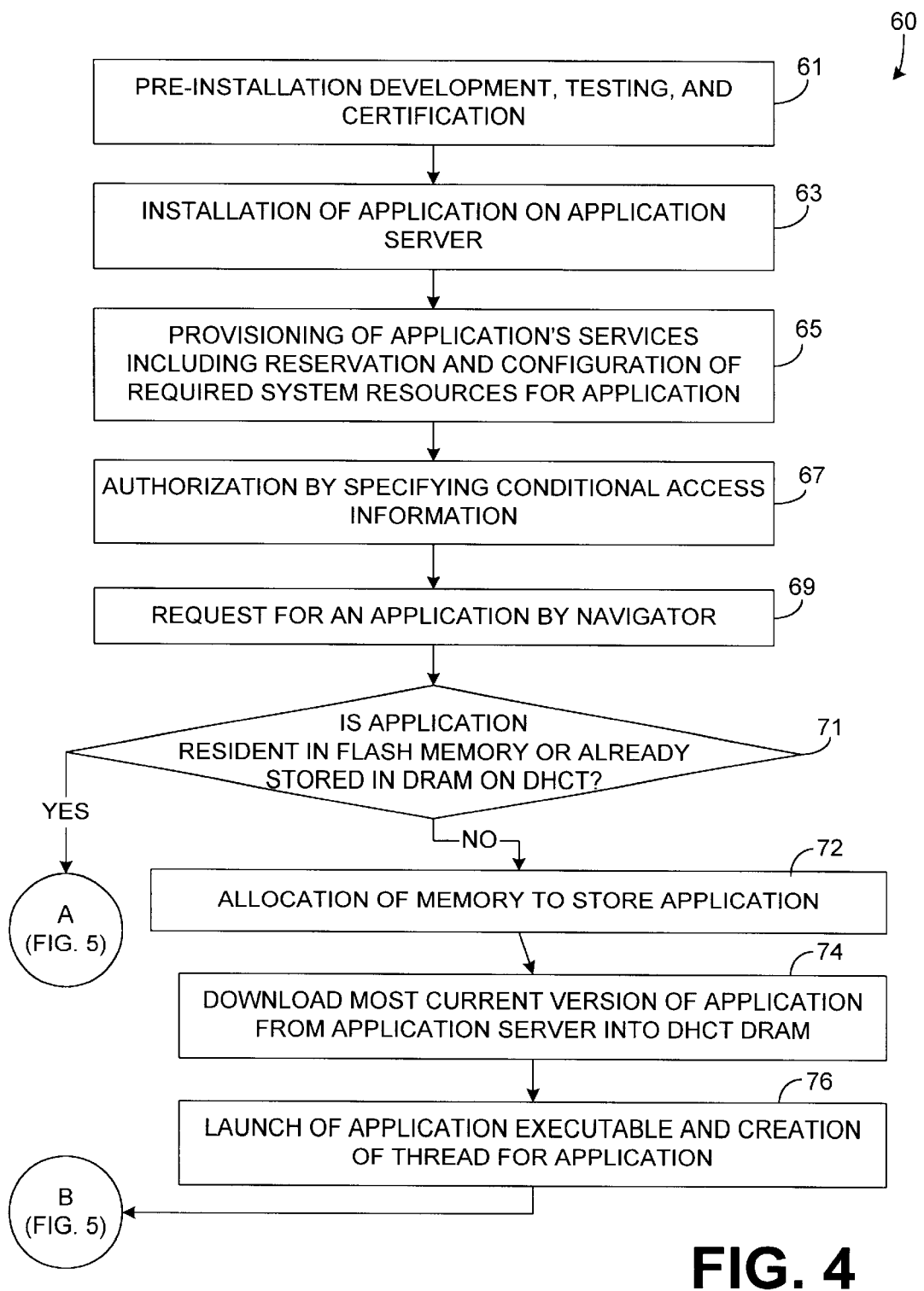
FIGS. 4 and 5 are flowchart representations of the application lifecycle of applications installed on the network for execution in the DHCT as depicted in FIG. 2.
Figure 5:
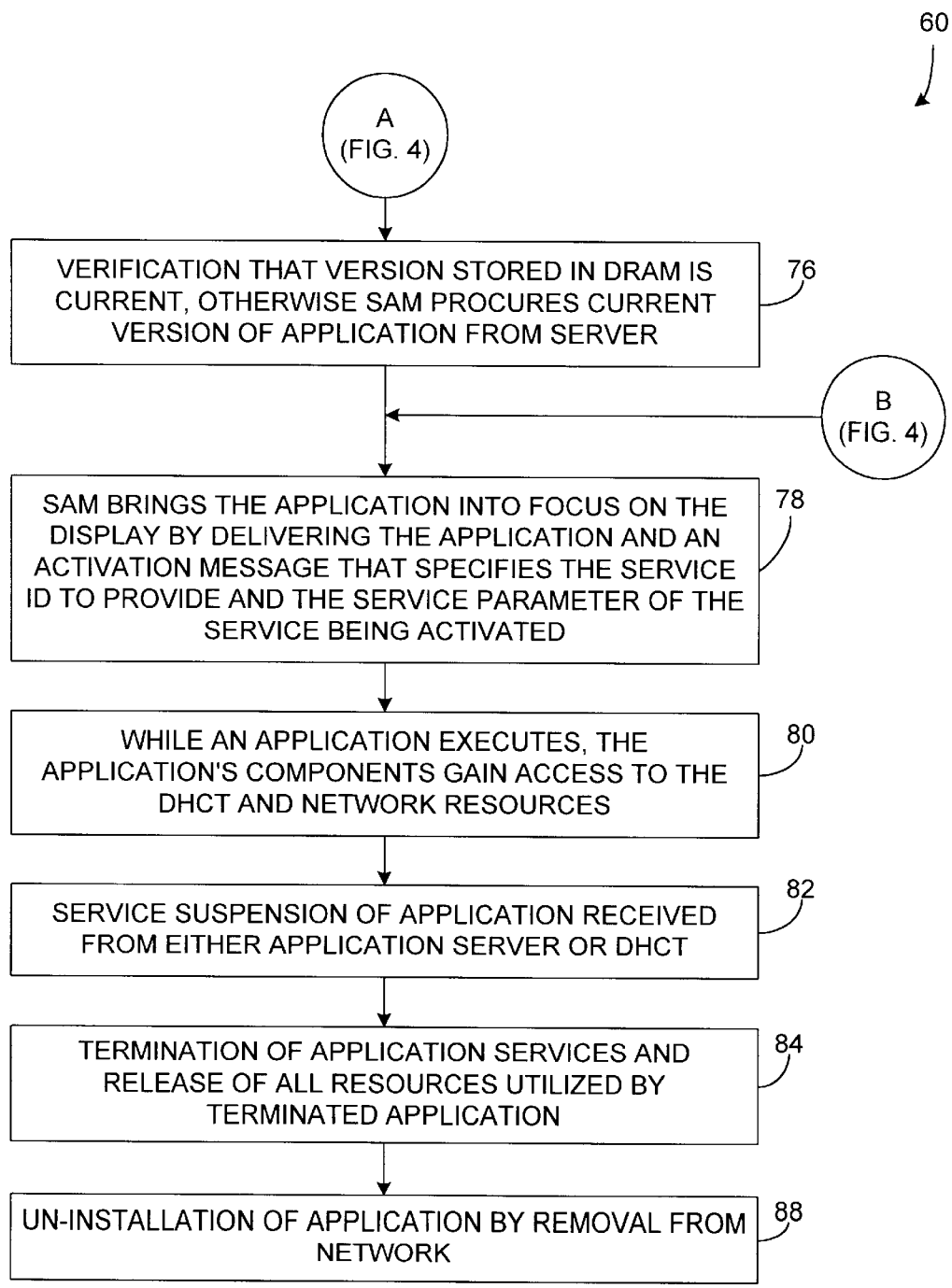

With additional reference to FIGS. 4 and 5, the lifecycle of an application 60 as implemented by the system depicted in FIG. 3 begins with the development, integration, testing, and certification of the application before it is released for use by a subscriber, as shown in step 61. Development includes creation of separate application executables for the headend 11 and the DHCT 16 and an installable application package. The completed application, including components for headend 11 and DHCT 16, are tested on an end-to-end digital network, including all RF components. The application is tested for functionality to insure that it meets product specifications and subscriber requirements. Finally, an application is certified by testing the application's interaction with the entire system while providing its individual services. Issues such as memory leakage, resource management, network traffic impact, and latency are addressed to insure that an application runs properly under loaded conditions.

The next step in an application's lifecycle 60 calls for the application to be installed on an application server hardware platform 51 and included in a set of applications currently existing on the network 20, as depicted in step 63. In a non-limiting example, a first application server 51' (FIG. 3) may be a video-on-demand application and a second application server 51" (FIG. 3) may be a pay-for-view application.

After an application is installed, it is provisioned, as shown in step 65. Provisioning is the process that defines an application's services, including the reservation and configuration of system resources needed to provide those services. Provisioning includes adding the application to the BFS server 55 (FIG. 3) and registering it with the SAM server 56 (FIG. 3). An application is identified by a URL and is characterized by several attributes. One attribute included in the URL is whether or not the application stays resident after all of the application's services are suspended, and another is whether the application has conditional access to be used for the application and service authorization. An additional URL parameter that may be inserted during provisioning is whether an application is denoted as one that is loaded when the DHCT 16 is initialized and optionally launched.

The application servers 51 (FIG. 3) utilize application interface system components such a session manager, a messaging server, a conditional access manager, the BFS, and an IP gateway (components not shown—except for BFS (FIG. 3)). Once provisioned, the application server 51 uses the SAM server 56 (FIG. 3) to register each service by providing the service parameter(s) such as a short and long description, optional logo, and alternative services if the service is not authorized. Additionally, the service is given a service ID and assigned to channels via the SAM server 56.

The next step of the application lifecycle, as shown in step 67 in FIG. 4, is configuring the authorization level of the application. Service authorization is generally an application-dependent mechanism, but typically relies on conditional access facilities provided by headend 11 and DHCT 16 components. Once the authorization level for the application is configured, the application is introduced in the network system. The SAM 37 (FIG. 2) provides an interface to query if a service is authorized. If the application providing the service specifies conditional access information when the service is provisioned, the SAM 37 (FIG. 2) utilizes this information to determine service authorization for a conditional access manager client (not shown). If so configured, the SAM 37 (FIG. 2) asks the application if its services are authorized, because only the application has the facilities to answer that question, based on the service parameter assigned in step 65.

According to step 69 in FIG. 4, a request for an application may originate from the DHCT 16, specifically the navigator 35, when a subscriber inputs a command via an input device such as the remote control 27. Note, however, that any application client or server can initiate a request for a service. A service requested may be defined in the set of existing services (identified by the service ID), or it can be a new, dynamic service where the definition and activation request occur simultaneously. Upon receiving the request in step 69, the SAM 37 determines whether the target application is resident in flash memory 31 or already stored in DRAM 32 from a previous download, as shown in step 71. Typically, an application remains in DRAM 32 after its initial download until the DHCT 16 upgrades the version of the application or whenever the DHCT 16 must remove the application from memory to create memory capacity for other applications.

Figure 8:
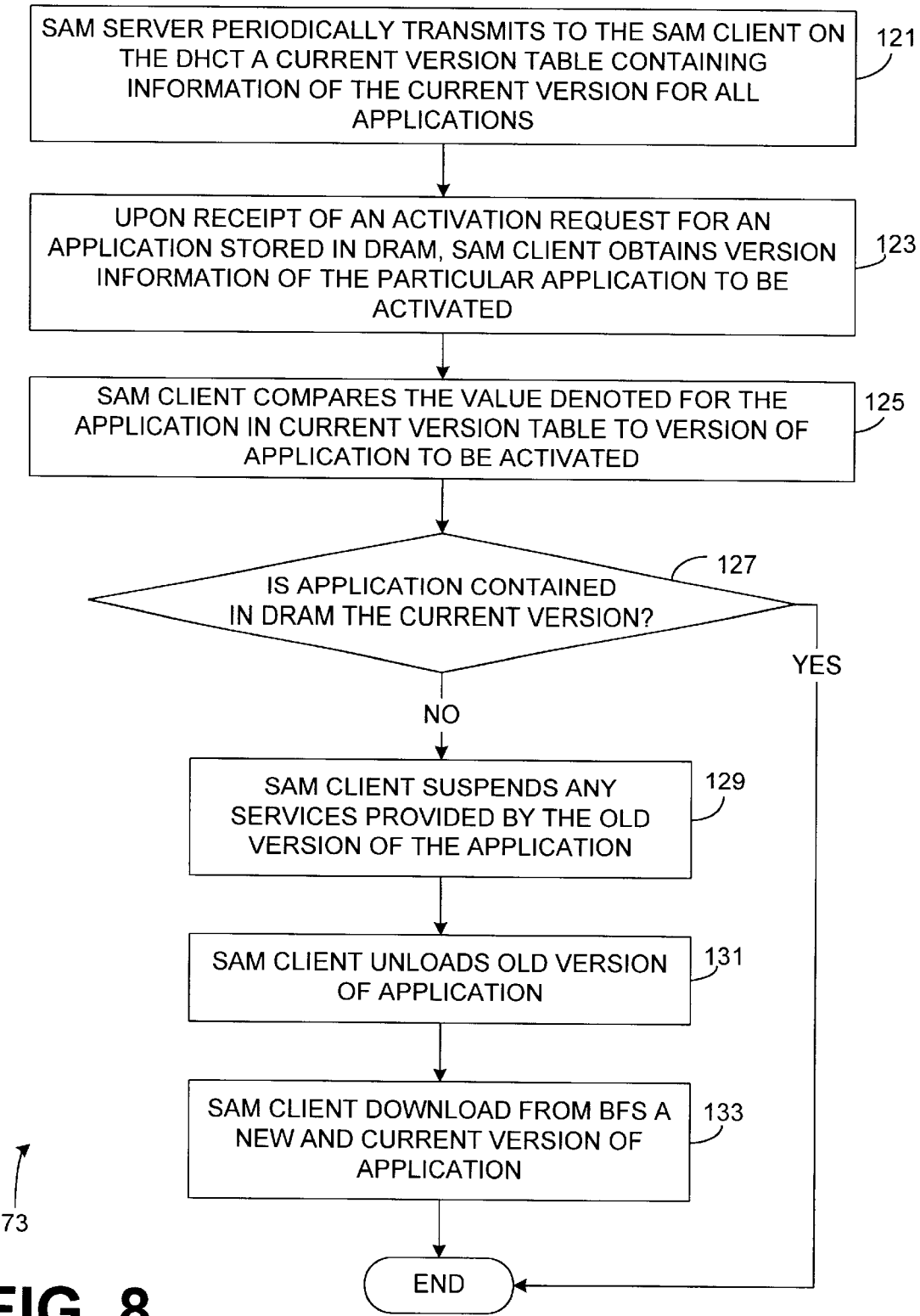
FIG. 8 is a flowchart representation of the application versioning process implemented by the DHCT in FIG. 2 to insure that each application executed by the DHCT is the most current version of the application available and supported by the cable television system.

If the application is already stored in DRAM 32, the SAM 37 determines whether the application in DRAM 32 is the most current version available for execution as shown in step 73. The SAM 37 allows applications to specify a version in the application URL equal to the version of the application currently available on the BFS. Whenever a service is activated, the SAM 37 compares that version with the version received in the SAM information tables loaded from the SAM server. If SAM 37 determines that the version of the application in DRAM 32 is not the most current version, SAM 37 obtains the most current version from the BFS server 55. The process of application versioning—automatically obtaining the most current version of an application—is discussed in more detail below and is shown in FIG. 8.

If SAM 37 determines in step 71 that the application is not contained in DRAM 32, the DHCT 16 must download the application as one or more data files from the BFS server 55 (FIG. 3); however, the SAM 37 must allocate memory capacity for the application to be downloaded, as shown in step 72. The SAM 37 must not only obtain memory capacity for the application to be downloaded, but also sufficient memory capacity to execute the application and thus must allocate memory for the application's executable software program and the related data components. Allocation of memory to store and execute an application, in step 72, is discussed in more detail below.

After sufficient memory capacity has been reserved for the application in step 72, the DHCT 16 downloads the application from the BFS server 55 (FIG. 3 and as described above), as in step 74. The SAM 37 arranges for the application to be downloaded using a stream manager application program interface (not shown) of the operating system 33. The download process is asynchronous so that a suspension request can cancel the activation. If appropriate, the navigator 35 presents a "download barker" to inform the subscriber that the service is being downloaded and to enable the subscriber to cancel the download action in favor of another service. After the application is downloaded from the BFS 41, 55, its initialization function is called by the operating system 33, and the application is launched, as shown in step 76. Launching the application runs the application's executable program. When launched, a thread is created for the application and its main function is called by the operating system 33.

After the application is downloaded and launched in steps 74 and 76 respectively, the service is ready to be activated as in step 78 in FIG. 5. The SAM 37 brings the application into focus on the display 21 (FIG. 2) by delivering the application client and an activation message that specifies the service ID to provide and the service parameter of the service being activated. Upon activation, the application begins providing its service and executes on the DHCT 16 as depicted in step 80. While an application executes, it uses application interface components in the DHCT 16 such as the window manager 39, a session manager (not shown), and a stream manager (not shown) to gain access to the DHCT 16 and network resources. During execution, the application must abide by the service resource environment and must handle all combinations of resource availability gracefully.

A service may be suspended as shown in step 82 by either the application server 51 (FIG. 3) or by the DHCT 16. During suspension, the SAM 37 first receives the request to end a service. Typically, the request to suspend a service originates from the navigator 35 by identifying the particular service ID. The suspension of service request is transferred to the SAM 37, which keeps track of all applications currently providing services in service database 40. If the application is presently being downloaded when the suspension request for that particular service is received by the SAM 37, the SAM 37 terminates the download. The SAM 37 sends the application a suspend message with the service ID to suspend. The application must suspend the service and minimize any resource usage particular to that service, but the SAM 37 may permit the application to keep certain resources for the application in anticipation of the service being re-activated. Minimization of the application to free resources is discussed in more detail below in regard to memory management and allocation of resources for downloading applications. (See FIGS. 6 and 7).

Termination of an application results in ending the execution of the application by the DDHCT 16, as shown in step 84. Termination is usually initiated by the SAM 37 to make room for another application to be executed in the DHCT 16, and this is discussed in more detail below. Termination begins with a request to the application from the operating system 33 to free all resources. This is followed by executing its shutdown method and unloading its code from the DRAM 32 of the DHCT 16—unless the application is resident in flash memory 31 (navigator 35 is an example of a resident application.)

The final step 88 in the lifecycle of an application 60 is the un-installation of the application from the cable television system 10 (FIG. 1). All applications are removable from the cable television system 10. During un-installation of an application, all provisioning is undone, the application code and data are removed from the BFS server 55, the application is un-registered, and the application server code is removed from the headend 11.

Figure 6:
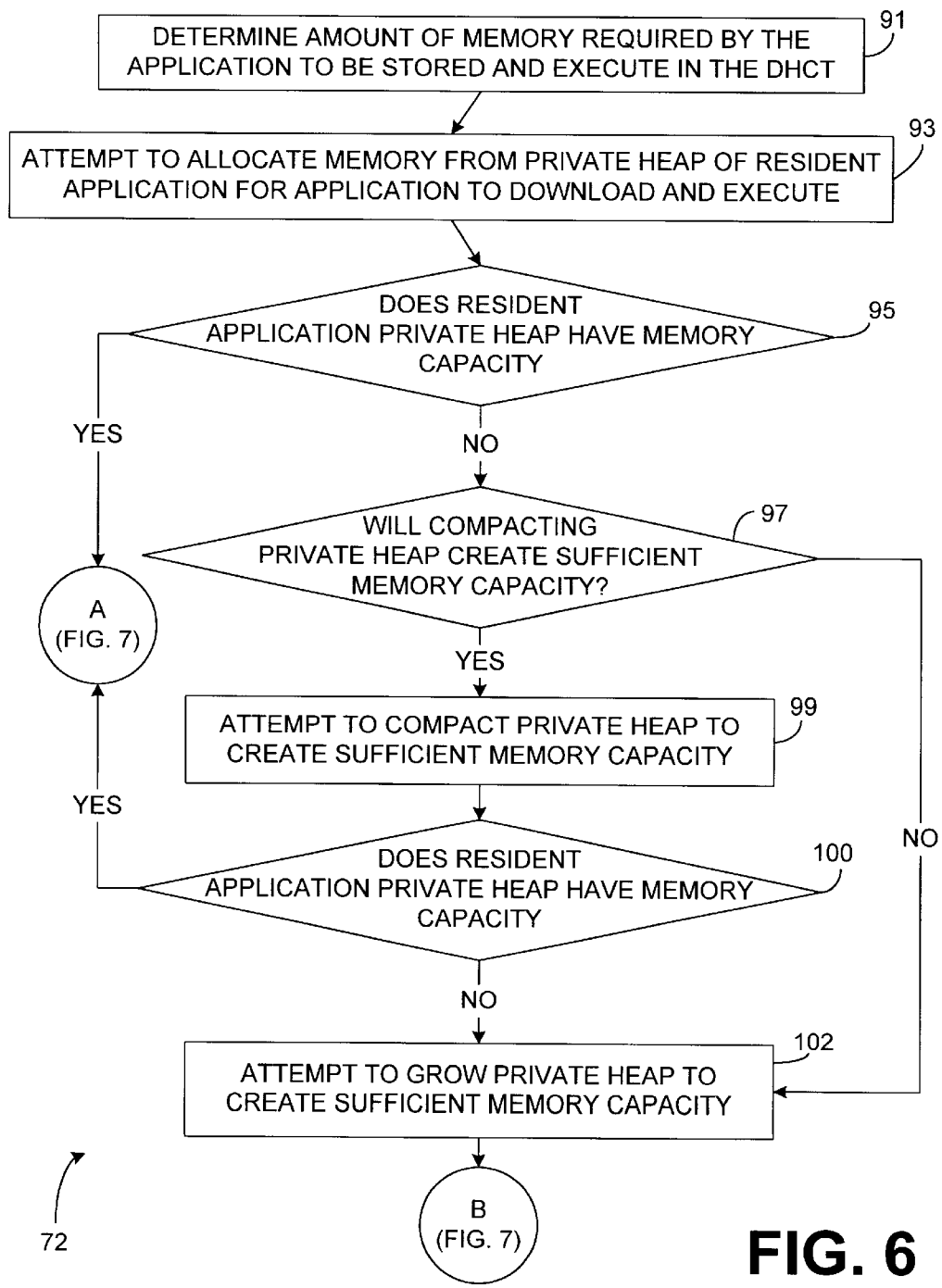
FIGS. 6 and 7 are flowchart representations of the memory management process implemented by the DHCT in FIG. 2 to allocate sufficient memory capacity to download and execute applications.
Figure 7:
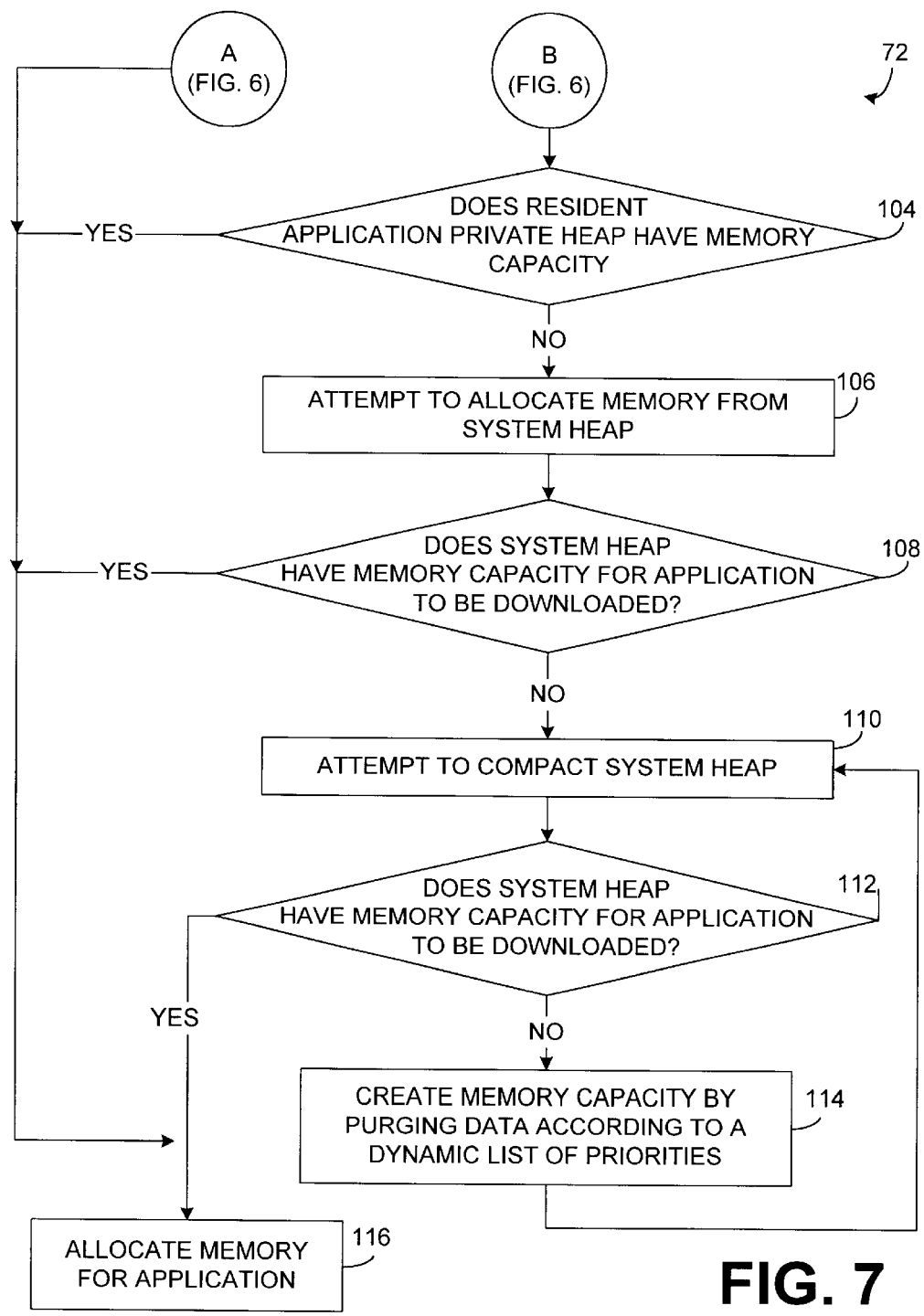

As discussed above in step 72 of FIG. 4, memory in DRAM 32 must be allocated for an application prior to downloading the application. FIGS. 6 and 7 are flowchart representations of the memory management process implemented by the DHCT 16 in FIG. 2 to allocate sufficient memory capacity to download and execute an application. As depicted in step 91, the DHCT 16 determines the memory capacity required to simply store an individual application in DRAM 32 and additionally the memory capacity required to execute the application once activated. During provisioning of the application, as described in step 65 of FIG. 4, indication of the amount of DRAM 32 required to execute the application can be specified in the application's URL.

As depicted in step 93, the SAM 37 must make sure that memory is allocated for the application. The SAM download daemon 34 (FIG. 2) transfers an application's memory requirements to the memory manager 47 (FIG. 2) for allocation of DRAM 32. Regarding memory for execution of the application to be downloaded, the memory manager 47 (FIG. 2), in one embodiment, attempts to allocate execution memory capacity at the same time the memory manager 47 (FIG. 2) allocates memory capacity for simple storage of the application executable in DRAM 32. In an alternative embodiment, the memory manager 47 (FIG. 2) attempts to allocate memory capacity for the execution of an application after the application executable is downloaded and stored in DRAM 32.

A first attempt to allocate memory for an application may be made from the private heap (not shown) that is a portion of memory in DRAM 32 apportioned for use by the navigator 35. At step 95, a determination is made by the memory manager 47 (FIG. 2) of whether the private heap has memory capacity to store and execute the application by comparing the available capacity amount to the size of the application executable on the BFS and to the URL specification of memory required. If the private heap has capacity for the application, the memory manager 47 (FIG. 2) allocates the required memory capacity to the application, as in step 116 (FIG. 7), and reports the allocation to SAM 37 for downloading the application. The SAM daemon 34 (FIG. 2) downloads the application, and the lifecycle of the application proceeds as discussed above and as shown in FIGS. 4 and 5.

If the private heap does not have the memory capacity to store the application to be downloaded, the memory manager 47 (FIG. 2) determines whether compacting the private heap will create sufficient memory capacity for the application, as shown in step 97. Compaction of the private heap only occurs if memory manager 47 (FIG. 2) determines that performance will not be degraded by the compaction process. If memory manager 47 (FIG. 2) determines, from step 97, that compaction of the private heap may create sufficient memory capacity for the application, only then will the operating system be asked to compact the heap in step 99. Compaction is supported by the operating system, which implements a handle-based memory management scheme. During compaction, handles that are not "locked," or in use, are moved in memory such that the allocated memory fits in a contiguous portion of memory. Memory compaction algorithms are well-known in the state of the art of operating system design.

After compacting the private heap, memory manager 47 (FIG. 2) again determines whether the private heap has sufficient capacity to store and execute the application in step 100. If so, then the memory manager 47 (FIG. 2) allocates the required memory capacity to the application, as in step 116 (FIG. 7), and reports the allocation to SAM 37 for downloading the application. The SAM daemon 34 (FIG. 2) downloads the application, and the lifecycle of the application proceeds as discussed above and as shown in FIGS. 4 and 5.

If memory manager 47 (FIG. 2) determines in step 97 that compaction of the private heap would not create sufficient memory capacity for the application, or in step 100, that compaction actually failed to produce sufficient memory capacity for the application, memory manager 47 (FIG. 2) will make a single attempt to grow, or enlarge, the private heap's capacity (step 102) to make room for the application to be downloaded. Growing the private heap requires the memory manager 47 (FIG. 2) to allocate memory from the memory heap of the operating system 33 (not shown and hereinafter referred to as the "system heap") to the private heap. After allocating memory to the private heap, memory manager 47 (FIG. 2) again determines whether the private heap is finally large enough to store and execute the application to be downloaded, as shown in step 104, in FIG. 7. If so, then the memory manager 47 (FIG. 2) allocates the required memory capacity to the application, as in step 116 (FIG. 7), and reports the allocation to SAM 37 for downloading the application. The SAM daemon 34 (FIG. 2) downloads the application, and the lifecycle of the application proceeds as discussed above and as shown in FIGS. 4 and 5.

If the private heap still does not have capacity to store the application that is to be downloaded, the memory manager 47 (FIG. 2) attempts to allocate the memory from the system heap, as depicted in step 106. Note that an alternative embodiment that does not utilize a private heap may start the memory allocation algorithm at this step. In the preferred embodiment, allocations to the system heap cannot remained locked, thereby constraining resources that may ultimately be needed for other applications. Thus, applications stored in the system heap of memory must be purgeable and immediately releasable from memory. Consequently, memory manager 47 (FIG. 2) makes a similar analysis to steps 95 and 100 but in regard to the system heap's capacity for the application, as in step 108. If the system heap has memory capacity to store and run the application, the memory manager 47 (FIG. 2) allocates the required memory capacity to the application, as in step 116 (FIG. 7), and reports the allocation to SAM 37 for downloading the application. The SAM daemon 34 downloads the application, and the lifecycle of the application proceeds as discussed above and as shown in FIGS. 4 and 5.

If, however, memory manager 47 (FIG. 2) determines that the system heap has insufficient memory capacity to store (and potentially execute) the application, memory manager 47 (FIG. 2) will ask the operating system to compact the system heap, as depicted in step 110. Compaction of the system heap is only attempted if system performance will not be compromised. After the system heap is compacted, if memory manager 47 (FIG. 2) determines that the system heap now has sufficient memory capacity for the application in step 112, the memory manager 47 (FIG. 2) proceeds to step 116 and allocates the memory from the system heap to the application and continues the application lifecycle as discussed above. If the system heap does not have capacity after compaction in step 110, memory manager 47 (FIG. 2) proceeds to step 114 and attempts to allocate memory capacity by purging data already contained in the system heap in DRAM 32.

The memory manager 47 commences an operation to purge data already contained in DRAM 32 and thereby free memory according to a list of priorities supported by the operating system 33. The operating system 33 provides the memory manager 47 with purge priorities for each memory allocation, as set by the individual applications performing the allocation. As an application is downloaded and stored in DRAM 32, it contains information of its priority in the system. This priority information is transferred to the operating system 33 and stored in a table of purge priorities (not shown). The table of priorities is a dynamic listing of priorities maintained by the operating system 33 as applications and their corresponding data are downloaded to the DHCT 16. In one embodiment the system operator, during the provisioning process of an application, assigns a purge priority parameter to the application and any data files required to execute the application that is ultimately included in the table of priorities in the operating system of the DHCT 16.

When the memory manager 47 reaches step 114 and must remove data from the DHCT 16, the memory manager 47 begins with applications or data contained in DRAM 32 with the lowest priority. The memory manager 47 removes the application or data with the lowest priority from DRAM 32 thereby creating new memory capacity for storing the application to be downloaded from the headend 11. After purging applications or data files with the lowest priority, the memory manager 47 reverts to step 110 and attempts to re-compact the system heap. If the memory manager 47 determines in step 112 that sufficient memory capacity now exists for the application to be downloaded, the memory manager 47 (FIG. 2) allocates the required memory capacity to the application, as in step 116 (FIG. 7), and reports the allocation to SAM 37 for downloading the application. The SAM daemon 34 downloads the application, and the lifecycle of the application proceeds as discussed above and as shown in FIGS. 4 and 5.

If the memory manager 47 determines in step 112 that the system heap is still too small to store the application, it proceeds again to step 114 and purges applications or data of the next lowest priority from the priority of the files previously purged. The memory manager 47 continues to follow the steps of purging the lowest priority applications and data followed by system heap compaction until sufficient memory capacity is created for the application that previously could not be downloaded. When the memory manager 47 creates enough memory capacity for the application to be downloaded, an indication is passed to the SAM 37 for commencement of downloading of the application.

The priorities of which applications and data are purged first are, as stated above, dynamic and intended to insure that the most important applications are not removed from DRAM 32. As a non-limiting example, applications that are provisioned as applications to load upon initialization may be given the highest priority since they are applications that are always downloaded to the DHCT 16. This type of application basically is resident on the DHCT 16 because it is always downloaded upon initialization, so because the system operator has determined that the application should always be available to the subscriber, it typically bears one of the highest priorities. Additionally, as an example, program data files (not shown) for an interactive program guide (not shown) that include television viewing information for a current day may gamer one of the highest priorities because, without that information, the subscriber may not be able to choose a television program to view thereby defeating one of the applications of the DHCT 16. In contrast, the program data files containing television viewing information for future days may have a lower priority because the DHCT 16 may be able to download this information in the future when needed.

Additionally, application priorities are adjusted dynamically such that applications currently providing a service to the user of the DHCT have a higher priority than those whose executable is resident in DRAM but that is not currently providing a service. Applications also may change the priority of their data depending on their service activation status.

The memory allocation process described above and in FIG. 6 and FIG. 7 is used not only for allocating the initial memory to store and execute the application executable, but also for allocating additional memory that an application client may require while providing its services. For example, the email application 45 (FIG. 2) may need to allocate additional memory for downloading a presenting an image attachment. The memory manager 47 is asked in the same manner as FIG. 6 and FIG. 7 to allocate the needed memory, given a particular priority of the allocation. Thus, in order to allocate the memory for the image attachment, other lower priority data and even applications may be unloaded. Thus, any application may, while executing, require additional memory resources and require the memory manager 47 to obtain capacity. Additionally, the nature of the memory allocation process described in this invention allows multiple applications to provide multiple services simultaneously in a memory-constrained environment such as the DHCT 16.

In similar fashion, other applications and data files may be assigned varied priorities so that the operating system 33 of the DHCT 16 compiles these priorities in a list for implementing step 114 in FIG. 8. The memory manager 47 continues to execute steps 110, 112 and 114 until sufficient memory capacity is created by removing applications and data files of the lowest priority.

In an alternate embodiment, each application comprises a specification as to whether its executable software program can function with a reduced amount of data allocation in memory. The specification further specifies one or more decrements of data allocation in addition to the preferred data allocation size. When an application is to be downloaded and the amount of memory is insufficient to accommodate all of the application's data allocation components, the downloaded application is forced to run with a reduced amount of data allocation rather than forcing one of the existing applications to execute with a reduced amount of memory allocation.

In an alternate embodiment, an application's data component is transmitted from headend 11 to DHCT 16 in a compressed format. Under normal operation without memory constraints, an application's data component is decompressed and stored in DRAM 32 in its decompressed data state. Once an additional application is downloaded to DHCT 16, if the amount of DRAM 32 is insufficient to accommodate all of the application's data allocation components, the data allocation component of one or more applications in the DHCT 16 is retained in DRAM 32 in a compressed format. Thereafter, when one or more specific subsets of a data component are required to be input to an application's software program during the course of execution, the respective subsets of the data components are input to a decompressor (not shown) that decompresses them as individual subsets (rather than decompressing the entire data component) and the decompressed data output by the decompressor is then input in decompressed format to the application's executable software program. Likewise, prior to being stored in the section of memory allocated to the application's data component, a specific subset of data that is output by the application's executable software program is input to a compressor that outputs compressed data to be stored in memory.

In an alternate embodiment, the DHCT 16 contains a local storage device (not shown) such as a hard drive, either internally connected to the DHCT 16 or externally connected to the DHCT 16 via a communication port (not shown) such as USB or IEEE-1394. Under normal operation without memory constraints, an application's data component is stored in memory. If the amount of memory is insufficient to accommodate all of the application's data allocation components, to vacate memory space, one or more parts of the data component of one or more applications in the DHCT 16 is transferred from memory to the local storage device, resulting in storing the respective data components in the local storage device. When an application requires data stored in the storage device and there is insufficient memory to store the required data, the application transfers and stores a second part of data from one or more data components from memory to the local storage device to make space in memory. The application then proceeds to transfer and store the required data from the storage device to the vacated section of memory.

An application may additionally be downloaded into the local storage device rather than into DRAM 32 so as to conserve the DRAM 32. Whenever an application is called, the SAM 37 determines whether the target application resides in the local storage or in the DRAM 32 of the DHCT 16. If the SAM 37 determines that the desired application resides in the local storage device, it is then that the application is launched into DRAM 32. This process takes advantage of the memory resources of the local storage device for retaining multiple applications while reserving DRAM 32 for applications that are executing or are most commonly activated.

The DHCT 16 also, as discussed above regarding step 73 in FIG. 5, routinely verifies that each application stored in DRAM 32 is the most current version of that application available from the headend 11 server. FIG. 8 is a flowchart representation of the application versioning process implemented by the DHCT 16 in FIG. 2 to insure that each application executed by the DHCT is the most current version of the application available and supported by the cable television system.

The SAM server 56 (FIG. 3) maintains version information in service database 40 containing information of a most current version for each application currently available on the BFS 41, 55 (FIGS. 2 and 3 respectively). The SAM server 56 places the current version information in the service tables broadcast over the network 20 to the SAM 37 of each DHCT 16, as shown in step 121. Typically, the current version is updated in the service tables transmitted to the DHCTs in the network 20 whenever an application is updated on an application server 51 (FIG. 3). SAM 37, upon receipt of the service table, stores the version information in the service database 40 (FIG. 3) in DRAM 32 (FIG. 3) for use when an application stored in DRAM 32 (FIG. 3) is activated upon subscriber command.

Each time an application is downloaded into the DRAM 32, the application's URL includes information of the version of that application. As a non-limiting example, the format of the URL parameter may be "version=<MDT version>." As discussed above, SAM 37 receives the current version parameter related to all applications and stores the current version parameter in service database 40 in association to the downloaded application. When a service provided by the application is subsequently activated by the subscriber, SAM 37, prior to activating the application's service, retrieves the current version parameter for the application to be activated from the service database 40, as in step 123. SAM 37 compares the current version parameter retrieved from the service database 40 to the version of the application executable in DRAM 32, as shown in step 125, and determines if the versions match, as shown in step 127. If so, then the application proceeds in the lifecycle of the application as discussed above. If the versions do not match, the SAM 37 suspends any services provided by the older version of the application stored in DRAM 32 as in step 129, unloads the old version 131, and downloads the updated version from the BFS 41, 55 (FIGS. 2 and 3 respectively). After downloading the newer version of the application to DRAM 32, as in step 133, the SAM 37 activates the services provided by the application as discussed above for the lifecycle of the application.

SAM 37 can use the out-of-band quadrature phase shift keying (QPSK) tuner component (not shown) of the tuner system 25 to download an updated version of an application over BFS while the tuner system 25 is tuned to a different service or application. As a result, when a subscriber attempts to initiate any application in DRAM, the DHCT 16 will be able to immediately activate the current version of the application and will not be forced to wait for the DHCT to download an updated application.

The memory management and application versioning process as described above may be implemented as programs comprising ordered listings of executable instructions for implementing logical functions. Additionally, the programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the programs for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Any process descriptions or blocks in flowcharts should be understood as representing modules, segments, or portions of code that include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred embodiments" are merely possible examples of the implementations, merely setting forth for a clear understanding of the principles of the inventions. Any variations and modifications may be made to the above-described embodiments of the invention without departing substantially from the spirit of the principles of the invention. All such modifications and variations are intended to be included herein within the scope of the disclosure and present invention and protected by the following claims.

What is claimed is:

1. A method for managing memory in a communication terminal coupled to a server device enabling the communication terminal to provide memory capacity for storing in a memory and executing on the communication terminal a plurality of applications downloaded from the server device, the method comprising the steps of:

determining an amount of memory capacity required by an application client to be downloaded from the server device;

attempting to allocate the memory capacity to the application client, wherein the step of attempting to allocate the memory capacity comprises the steps of:

attempting to allocate memory capacity to the application client from a private heap of the memory; and attempting to allocate the memory capacity from a system heap of the memory to the application client if the private heap has insufficient capacity to store the application client;

purging data contained in the memory according to a dynamic list of priorities to create memory capacity in the memory for the application client if the communication terminal has insufficient memory capacity for the application client;

allocating the memory capacity to the application client; and receiving the application client from the server device.

2. The method of claim 1, wherein the step of attempting to allocate the memory comprises the steps of:

determining whether compacting a private heap will create sufficient memory for the application client; and compacting the private heap to create the memory capacity if compacting the private heap will create sufficient memory, capacity for the application client.

3. The method of claim 1, wherein the memory capacity is a quantity of the memory sufficient to both store and execute the application client.

4. The method of claim 1, wherein the step of attempting to allocate the memory comprises the step of attempting to enlarge the size of a private heap to create the memory.

5. The method of claim 1, wherein the step of attempting to allocate the memory comprises the step of compacting a system heap to create the memory capacity if compacting the system heap will create sufficient memory capacity for the application client.

6. The method of claim 1, wherein the step of purging data contained in the memory comprises the step of purging a plurality of applications and data files of a lowest priority on the dynamic list of priorities before purging a plurality of applications and data files of a higher priority on the dynamic list of priorities.

7. The method of claim 6, further comprising the step of compacting a system heap after purging a plurality of applications and data files of a lowest priority.

8. The method of claim 1, wherein the dynamic list of priorities is created by compiling a priority parameter for each of a plurality of applications and data files stored in the memory of the communication terminal at any given time.

9. A method for managing memory in a communication terminal coupled to a server device enabling the communication terminal to provide memory capacity for storing in a memory and executing on the communication terminal a plurality of applications downloaded from the server device, the method comprising the steps of:

receiving a request for an allocation of-additional memory capacity from an executing application client on the communication terminal;

attempting to allocate the additional memory capacity to the executing application client, wherein the step of attempting to allocate the additional memory capacity comprises the step of compacting a system heap to create the memory capacity if compacting the system heap will create sufficient memory capacity for the application client;

purging data contained in the memory according to a dynamic list of priorities to create memory capacity in the memory for the application client if the communication terminal has insufficient memory capacity.for the executing application client; and allocating the additional memory capacity to the executing application client.

10. The method of claim 9, wherein the step of attempting to allocate the memory comprises the steps of:

determining whether compacting a private heap will create sufficient memory capacity for the application client; and compacting the private heap to create the memory capacity if compacting the private heap will create sufficient memory capacity for the application client.

11. The method of claim 9, wherein the step of attempting to allocate the memory comprises the step of attempting to enlarge the size of a private heap to create the memory capacity.

12. A method for managing memory in a communication terminal coupled to a server device enabling the communication terminal to provide memory capacity for storing in a memory and executing on the communication terminal a plurality of applications downloaded from the server device, the method comprising the steps of:

determining a normal and reduced amount of memory capacity required by an application client to be downloaded from the server device;

attempting to allocate the reduced amount of memory capacity to the application client if a total available memory is less than the normal amount of memory capacity required by an application client, wherein the step of attempting to allocate the reduced amount of memory capacity comprises the step of compacting a system heap to create the memory capacity if compacting the system heap will create sufficient memory capacity for the application client;

purging data contained in the memory according to a dynamic list of priorities to create the reduced amount of memory capacity for the application client if a total available memory is less than the reduced amount of memory capacity required by an application client;

allocating the reduced amount of memory capacity to the application client; and receiving the application client from the server device.

13. The method of claim 12, wherein the step of attempting to allocate the memory comprises the steps of:

determining whether compacting a private heap will create sufficient memory capacity for the application client; and compacting the private heap to create the memory capacity if compacting the private heap will create sufficient memory capacity for the application client.

14. The method of claim 12, wherein the step of attempting to allocate the memory comprises the step of attempting to enlarge the size of a private heap to create memory capacity.

15. A method for managing memory in a communication terminal coupled to a server device enabling the communication terminal to provide memory capacity for storing in a memory and executing on the communication terminal one or more individual subsets of a first data component downloaded from the server device, the method comprising the steps of:

receiving a first data component from the server device in a compressed format, wherein the first data component is decompressed if the memory capacity is sufficient to store the first data component, and wherein the first data component is retained in the compressed format if the memory capacity is insufficient to store the first data component in a decompressed format;

attempting to allocate the memory capacity from a system heap to one or more individual subsets of the compressed first data component when required for execution by an application client;

purging data contained in the memory according to a dynamic list of priorities to create memory capacity for of the one or more individual subsets of the first data component if the communication terminal has insufficient memory capacity for the one or more individual subsets of the first data component;

allocating the memory capacity to the one or more individual subsets of the first data component;

decompressing one or more individual subsets of the first data component if previously stored in a compressed format when required for execution by an application client;

implementing the application client to execute the decompressed one or more individual subsets of the first data component;

recompressing the one or more individual subsets of the first data component after execution by the application client; and storing the recompressed one or more individual subsets of the first data component in memory of the communication terminal.

16. A system for managing memory in a communication terminal coupled to a server device enabling the communication terminal to provide memory capacity for storing in a memory and executing on the communication terminal a plurality of applications downloaded from the server device, comprising:

logic configured to determine an amount of memory capacity required by an application client to be downloaded from the server device;

logic configured to attempt to allocate memory capacity to the application client, wherein the logic configured to attempt to allocate memory capacity is further configured to:

attempt to allocate memory capacity to the application client from a private heap of memory; and attempt to allocate memory capacity from a system heap of memory to the application client if the private heap has insufficient capacity to store the application client;

logic configured to purge data contained in the memory according to a dynamic list of priorities to create memory capacity in the memory for the application client if the communication terminal has insufficient memory capacity for the application client;

logic configured to allocate the memory capacity to the application once the memory capacity is obtained, wherein the application client is downloaded to the communication terminal.

17. The system of claim 16, wherein the logic configured to attempt to allocate the memory is further configured to:

determine whether compacting a private heap will create sufficient memory capacity for the application client; and compact the private heap to create the memory capacity if compacting the private heap will create sufficient memory capacity for the application client.

18. The system of claim 16, wherein the logic configured to attempt to allocate the memory is further configured to attempt to enlarge the size of a private heap to create the memory capacity.

19. The system of claim 16, wherein the dynamic list of priorities is created by compiling a priority parameter for each of a plurality of applications and data files stored in the memory of the communication terminal at any given time.

20. The system of claim 16, wherein the logic configured to purge data contained in the memory is further configured to purge a plurality of applications and data files of a lowest priority on the dynamic list of priorities before purging a plurality of applications and data files of a higher priority on the dynamic list of priorities.

21. A system for managing memory in a communication terminal coupled to a server device enabling the communication terminal to provide memory capacity for storing in a memory and executing on the communication terminal a plurality of applications downloaded from the server device, comprising:

logic configured to determine an amount of memory capacity required by an application client to be downloaded from the server device;

logic configured to attempt to allocate memory capacity to the application client, wherein the logic configured to attempt to allocate memory capacity is further configured to compact a system heap to create the memory capacity if compacting the system heap will create sufficient memory capacity for the application client;

logic configured to purge data contained in the memory according to a dynamic list of priorities to create memory capacity in the memory for the application client if the communication terminal has insufficient memory capacity for the application client;

logic configured to allocate the memory capacity to the application once the memory capacity is obtained, wherein the application client is downloaded to the communication terminal.

22. A system for managing memory in a communication terminal coupled to a server device enabling the communication terminal to provide memory capacity for storing in a memory and executing on the communication terminal a plurality of applications downloaded from the server device, comprising:

logic configured to receive a request for an allocation of additional memory capacity from an executing application client on the communication terminal;

logic configured to attempt to allocate the additional memory capacity to the executing application client, wherein the logic configured to attempt to allocate the additional memory capacity is further configured to compact a system heap to create the memory capacity if compacting the system heap will create sufficient memory capacity for the application client;

logic configured to purge data contained in the memory according to a dynamic list of priorities to create memory capacity in the memory for the application client if the communication terminal has insufficient memory capacity for the executing application client; and logic configured to allocate the additional memory capacity to the executing application client.

23. The system of claim 22, wherein the logic configured to attempt to allocate the memory is further configured to:

determine whether compacting a private heap will create sufficient memory capacity for the application client; and compact the private heap to create the memory capacity if compacting the private heap will create sufficient memory capacity for the application client.

24. The system of claim 22, wherein the logic configured to attempt to allocate the memory is further configured to attempt to enlarge the size of a private heap to create the memory capacity.

25. A system for managing memory in a communication terminal coupled to a server device enabling the communication terminal to provide memory capacity for storing in a memory and executing on the communication terminal a plurality of applications downloaded from the server device, comprising:

logic configured to determine a normal and reduced amount of memory capacity required by an application client to be downloaded from the server device;

logic configured to attempt to allocate the reduced amount of memory capacity to the application client if a total available memory is less than the normal amount of memory capacity required by an application client, wherein the logic configured to attempt to allocate the reduced amount of memory capacity is further configured to compact a system heap to create the memory capacity if compacting the system heap will create sufficient memory capacity for the application client;

logic configured to purge data contained in the memory according to a dynamic list of priorities to create the reduced amount of memory capacity for the application client if a total available memory is less than the reduced amount of memory capacity required by an application client;

logic configured to allocate the reduced amount of memory capacity to the application client; and logic configured to receive the application client from the server device.

26. The system of claim 25, wherein the logic configured to attempt to allocate the memory is further configured to:

determine whether compacting a private heap will create sufficient memory capacity for the application client; and compact the private heap to create the memory capacity if compacting the private heap will create sufficient memory capacity for the application client.

27. The system of claim 25, wherein the logic configured to attempt to allocate the memory is further configure to attempt to enlarge the size of a private heap to create the memory capacity.

28. A system for managing memory in a communication terminal coupled to a server device enabling the communication terminal to provide memory capacity for storing in a memory and executing on the communication terminal one or more individual subsets of a first data component downloaded from the server device, the method comprising:

logic configured to receive a first data component from the server device in a compressed format, wherein the first data component is decompressed if the memory capacity is sufficient to store the first data component, and wherein the first data component is retained in the compressed format if the memory capacity is insufficient to store the first data component in a decompressed format;

logic configured to attempt to allocate the memory capacity from a system heap to one or more individual subsets of the compressed first data component when required for execution by an application client;

logic configured to purge data contained in the memory according to a dynamic list of priorities to create memory capacity for of the one or more individual subsets of the first data component if the communication terminal has insufficient memory capacity for the one or more individual subsets of the first data component;

logic configured to allocate the memory capacity to the one or more individual subsets of the first data component;

logic configured to decompress one or more individual subsets of the first data component if previously stored in a compressed format when required for execution by an application client;

logic configured to implement the application client to execute the decompressed one or more individual subsets of the first data component;

logic configured to recompress the one or more individual subsets of the first data component after execution by the application client; and logic configured to store the recompressed one or more individual subsets of the first data component in memory of the communication terminal.

* * * * *

UNITED STATES PATENT AND TRADEMARK OFFICE
CERTIFICATE OF CORRECTION

PATENT NO.     : 6,629,227 B1
DATED          : September 30, 2003
INVENTOR(S)    : Jerding et al.

It is certified that error appears in the above-identified patent and that said Letters Patent is hereby corrected as shown below:

Column 10,
Line 4, delete "DDHCT" and insert therefore -- DHCT --.

Column 13,
Line 15, delete "gamer" and insert therefore -- garner --.

Signed and Sealed this

Twelfth Day of October, 2004

JON W. DUDAS
*Director of the United States Patent and Trademark Office*